(12) United States Patent
Yang et al.

(10) Patent No.: US 6,538,344 B1
(45) Date of Patent: Mar. 25, 2003

(54) UNINTERRUPTABLE POWER SUPPLY SYSTEM WITH AUTOMATIC DATA STORING ARRANGEMENT

(75) Inventors: Jen-Ta Yang, Taipei (TW); Chia-Chi Tsui, Taipei (TW)

(73) Assignee: Zone Technology, Inc., Taipei (TW)

( * ) Notice: Subject to any disclaimer, the term of this patent is extended or adjusted under 35 U.S.C. 154(b) by 85 days.

(21) Appl. No.: 09/593,391

(22) Filed: Jun. 14, 2000

(30) Foreign Application Priority Data

Dec. 20, 1999 (TW) ........................................ 88122439 A

(51) Int. Cl.$^7$ ................................................. G06F 1/30
(52) U.S. Cl. ........................ 307/66; 307/125; 713/300; 713/340
(58) Field of Search .............................. 307/64, 66, 65, 307/125, 126, 130; 713/300, 340, 323, 320, 324, 310

(56) References Cited

U.S. PATENT DOCUMENTS

| 4,122,359 A | * | 10/1978 | Breikss | 307/64 |
| 4,908,790 A | * | 3/1990 | Little et al. | 307/66 |
| 5,315,161 A | * | 5/1994 | Robinson et al. | 307/66 |
| 5,339,446 A | * | 8/1994 | Yamasaki et al. | 713/340 |
| 5,410,713 A | * | 4/1995 | White et al. | 307/66 |
| 5,659,208 A | * | 8/1997 | Kimble et al. | 307/65 |
| 5,717,936 A | * | 2/1998 | Uskali | 307/66 |
| 5,739,596 A | * | 4/1998 | Takizawa et al. | 307/66 |
| 5,748,972 A | * | 5/1998 | Clark et al. | 713/300 |
| 5,923,099 A | * | 7/1999 | Bilir | 307/64 |
| 5,944,828 A | * | 8/1999 | Matsuoka | 307/66 |
| 5,958,054 A | * | 9/1999 | O'Connor et al. | 713/300 |
| 6,049,884 A | * | 4/2000 | Tsuji | 307/66 |
| 6,098,175 A | * | 8/2000 | Lee | 713/340 |
| 6,225,708 B1 | * | 5/2001 | Furukawa et al. | 307/66 |
| 6,255,744 B1 | * | 7/2001 | Shih et al. | 307/64 |
| 6,274,949 B1 | * | 8/2001 | Lioux et al. | 307/64 |
| 6,304,976 B1 | * | 10/2001 | Kim | 713/300 |
| 6,341,354 B1 | * | 1/2002 | Lee | 713/324 |

* cited by examiner

Primary Examiner—Brian Sircus
Assistant Examiner—Roberto J. Rios
(74) Attorney, Agent, or Firm—Bacon & Thomas

(57) ABSTRACT

An uninterruptable power supply system is connected to motherboard and hard disk respectively. An interrupt signal is sent to power management circuit to command power management circuit to control the power switching circuit to switch the power of motherboard and hard disk to battery when a power interrupt is detected in a running computer by power detecting circuit. At the same time, central processing unit (CPU) on motherboard is commanded to save running programs and data in the hard disk. As such, CPU on motherboard can read the stored programs and data from hard disk when computer is turned on again. Thus computer may recover to the previous normal state. This can effectively avoid data lost once blackout occurred.

5 Claims, 2 Drawing Sheets

UNINTERRUPTABLE POWER SUPPLY SYSTEM WITH AUTOMATIC DATA STORING ARRANGEMENT

FIELD OF THE INVENTION

The present invention relates to uninterruptable power supplies (UPSs) and more particularly to an uninterruptable power supply system with automatic data storing arrangement.

BACKGROUND OF THE INVENTION

Blackout is not unusual to us. It is well known that one of the causes of blackout is overload which is even possible in peak periods. Such blackout may cause data stored in the random access memory (RAM) of a running computer to be lost if no UPS is electrically connected to the computer. As such, many users buy UPSs as a preventive means. Thus there are a variety of UPSs commercially available now.

But such conventional UPSs are unsatisfactory for the purpose for which the invention is concerned for the following reasons:

1. UPS only can supply power in a limited period of time. Further, there is no means provided to save data in the computer automatically. As such, data will be lost if no data backup is finished after that limited period of time expires.

2. UPS is bulky.

3. UPS is relatively expensive, resulting in an increase of cost borne on user.

4. UPS acts to convert a DC source into AC power prior to supplying the AC power to the power supply of the computer. The power supply of the computer then converts the AC power into DC power for the computer to use. A considerable amount of energy is lost during such conversions.

SUMMARY OF THE INVENTION

It is thus an object of the present invention to provide an uninterruptable power supply system connected to a motherboard and hard disk respectively. The status of the power supply of a running computer is detected by the power detecting circuit of the UPS system. Moreover, an interrupt signal is sent to the power management circuit to command the power management circuit to control the power switching circuit to switch the power of the motherboard and hard disk to battery for maintaining the normal operation of the motherboard and hard disk as soon as a blackout is detected in the power source. At the same time, a central processing unit (CPU) on the motherboard is commanded to save running programs and data in the hard disk. As such, the CPU on the motherboard can read the stored programs and data from the hard disk when the computer is turned on again. Thus, the computer may recover to the previous normal state. This can effectively avoid data lost once a blackout has occurred.

The above and other objects, features and advantages of the present invention will become apparent from the following detailed description taken with the accompanying drawings.

DETAILED DESCRIPTION OF THE PREFERRED EMBODIMENTS

Figure 1:
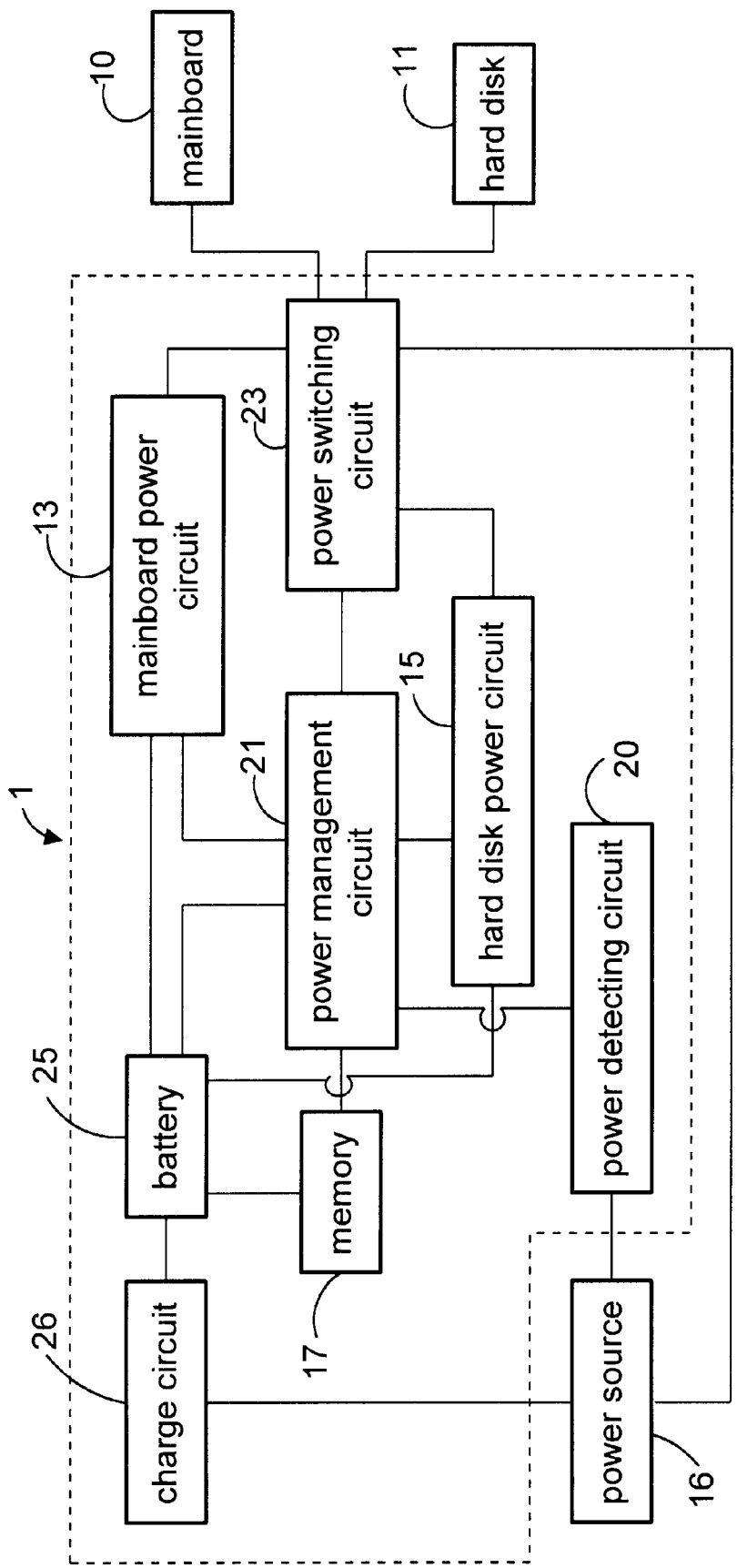
FIG. 1 is a block diagram of a preferred embodiment of UPS according to the invention.

Referring to FOG. 1, there is shown a UPS system 1 constructed in accordance with the invention. UPS system 1 is connected to motherboard 10, hard disk 11, and power source 16 respectively wherein power source 16 converts power from an external AC source into DC power for the computer to use. Such DC power is further fed to motherboard 10 and hard disk 11 via UPS system 1. UPS system 1 is switched automatically to supply energy to motherboard 10 and hard disk 11 to maintain the normal operation thereof as soon as a blackout is detected in power source 16 by UPS system 1. At the same time, the central processing unit (CPU) on mother board 10 is commanded to save running programs and data in the hard disk 11. This can effectively avoid data lost once a blackout has occurred.

UPS system 1 comprises a charge circuit 26, a battery 25, a memory 17, a motherboard power circuit 13, a hard disk power circuit 15, a power management circuit 21, a power switching circuit 23, and a power detecting circuit 20 wherein charge circuit 26 is connected between power source 16 and battery 25 such that power source 16 may charge battery 25 via charge circuit 26. Battery 25 is connected directly to memory 17, motherboard power circuit 13, and hard disk power circuit 15 respectively so as to maintain the normal operation of memory 17. Further, energy of battery 25 is converted into nominal power to feed to motherboard 10 and hard disk 11 via motherboard power circuit 13 and hard disk power circuit 15 respectively. In the invention, the status of external source (i.e., power source 16) is detected by power detecting circuit 20 of UPS system 1. Moreover, an interrupt signal is sent to power management circuit 21, the interrupt signal causing command power management circuit 21 to control the power switching circuit 23 to switch the connection of motherboard 10 and hard disk 11 to motherboard power circuit 13 and hard disk power circuit 15 respectively for maintaining the normal operation of motherboard 10 and hard disk 11 as soon as a blackout is detected in power source 16 by power detecting circuit 20. At the same time, memory 17 is commanded by power management circuit 21 to save running programs and data in the hard disk 11. As such, the CPU on motherboard 10 may read the above stored programs and data from hard disk 11 when the computer is turned on again. Thus, the computer may recover to the previous normal state. Further, in the normal status of power source 16 as detected by power detecting circuit 20, power switching circuit 23 is commanded to switch supply power to motherboard 10 and hard disk 11 for maintaining the normal operation thereof.

Figure 2:
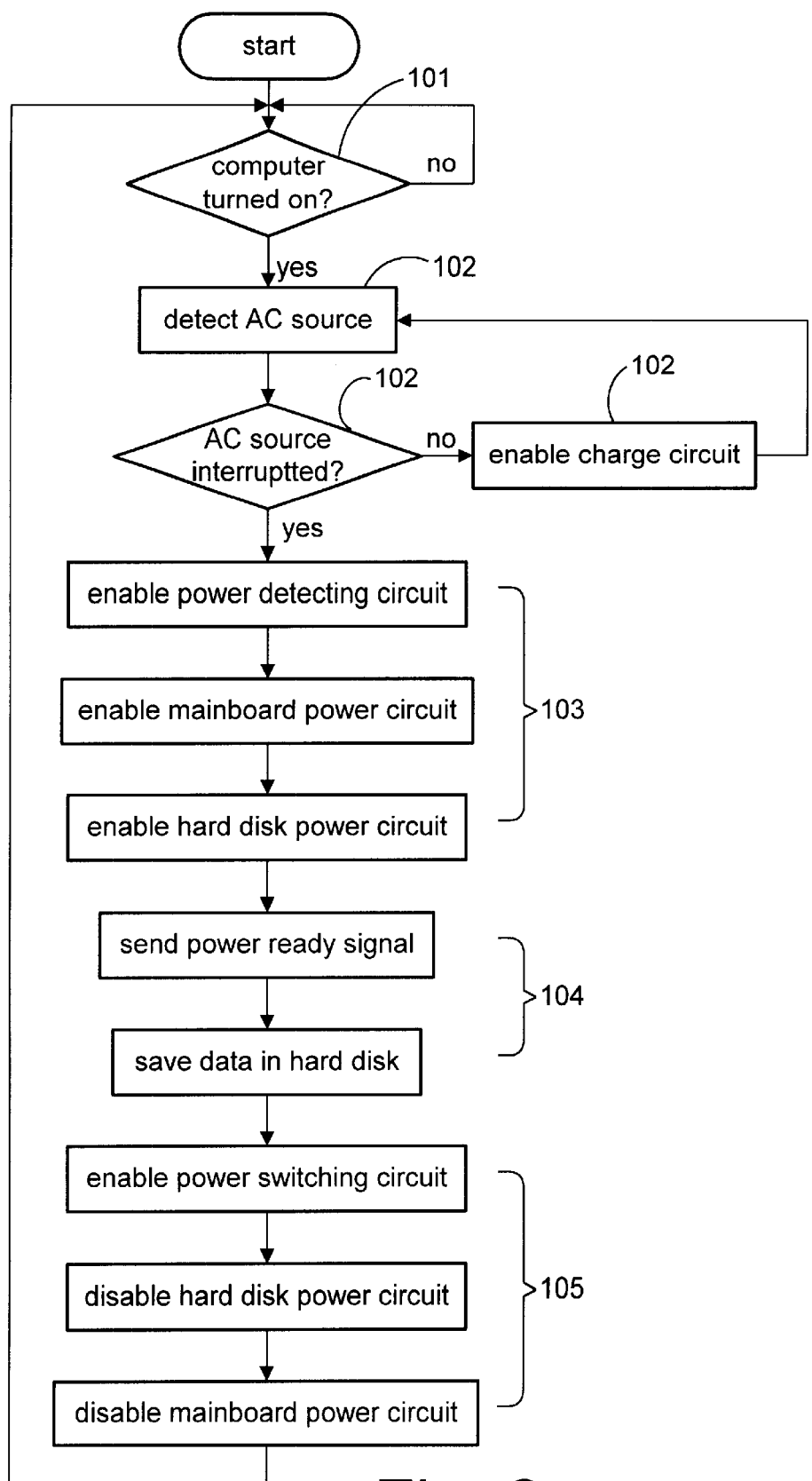
FIG. 2 is a flow chart diagram illustrating the operation of UPS of FIG. 1.

FIG. 2 illustrates a flow chart diagram of the operation of UPS system 1 of the invention shown in FIG. 1. The process comprises the steps of:

In step 101, the basic input-output system (BIOS) of the computer determines whether the computer is turned on. If yes, the BIOS goes to step 102. Otherwise, it returns to step 101 to repeat the above determination.

In step 102, power detecting circuit 20 detects whether power source 16 is powered by the external AC source. If yes, power management circuit 21 enables charge circuit 26 to command power source 16 to charge battery 25 via charge circuit 26. The process then returns to step 102 to repeat. Otherwise, it goes to step 103 if a blackout is detected in power source 16.

In step 103, power detecting circuit 20 sends an interrupt signal to power management circuit 21 to command power management circuit 21 to control the power switching circuit 23 to switch the connection of motherboard 10 and hard disk 11 to motherboard power circuit 13 and hard disk power circuit 15 respectively. At the same time, motherboard power circuit 13 and hard disk power circuit 15 are enabled to cause battery 25 to supply power to motherboard 10 and hard disk 11 for maintaining the normal operation thereof.

In step 104, power management circuit 21 sends a power ready signal to motherboard 10 to cause CPU on motherboard 10 to command memory 17 to save running programs and data in the hard disk 11.

In step 105, CPU sends a store completion signal to power management circuit 21 to command power management circuit 21 to control the power switching circuit 23 for disconnecting the power source 16 in order to disable motherboard power circuit 13 and hard disk power circuit 15, thereby turning off the computer. The process then returns to step 101 to repeat.

As a result, the CPU on motherboard 10 may read the above stored programs and data from hard disk 11 when the computer is turned on or power source 16 returns to normal again. Thus, the computer may recover to the previous normal state.

While the invention herein disclosed has been described by means of specific embodiments, numerous modifications and variations could be made thereto by those skilled in the art without departing from the scope and spirit of the invention set forth in the claims.

What is claimed is:

1. An uninterruptable power supply system electrically connected to a power source to send power to a hard disk and a motherboard having a central processing unit (CPU) of a computer, comprising:

a battery connected to a memory, a motherboard power circuit, and a hard disk power circuit, said battery being arranged to provide power directly from the battery to the memory, motherboard power circuit, and hard disk power circuit to respectively maintain the normal operations of the memory, the motherboard and the hard disk via the motherboard power circuit and hard disk power circuit respectively;

a charge circuit connected between the power source and the battery, which allow the power source to charge the battery via the charge circuit;

a power detecting circuit connected to the power source, which sends an interrupt signal to a power management circuit, said interrupt signal causing the power management circuit to control a power switching circuit to switch the connection of the motherboard and the hard disk from the external power supply to the motherboard power circuit and the hard disk power circuit respectively for maintaining the normal operation of the motherboard and the hard disk, and to save running programs and data in the memory to the hard disk when a blackout is detected in the power source by the power detecting circuit.

2. The uninterruptable power supply system of claim 1, wherein the power management circuit enables the charge circuit to command the power source to charge the battery via the charge circuit when a normal power status is detected in the power source by the power detecting circuit.

3. The uninterruptable power supply system of claim 1, wherein the power detecting circuit sends an interrupt signal to the power management circuit to command the power management circuit to control the power switching circuit to switch the connection of the motherboard and the hard disk to the motherboard the power circuit and the hard disk power circuit respectively when an abnormal power status is detected in the power source by the power detecting circuit, thereby enabling the motherboard power circuit and the hard disk power circuit to cause the battery to supply power to the motherboard and hard disk for maintaining the normal operation thereof.

4. The uninterruptable power supply system of claim 3, wherein the power management circuit sends a power ready signal to the motherboard to cause the CPU on the motherboard to command the memory to save running programs and data in the hard disk when the hard disk and the motherboard are switched to be powered by the battery.

5. The uninterruptable power supply system of claim 4, wherein after the CPU has commanded the memory to save running programs and data in the hard disk, the CPU sends a store completion signal to the power management circuit to command power management circuit to control the power switching circuit for disconnecting the power source in order to disable the motherboard power circuit and the hard disk power circuit, thereby turning off the computer.

* * * * *